J. DARLING.
MOLD.
APPLICATION FILED DEC. 6, 1916.

1,229,899.

Patented June 12, 1917.
3 SHEETS—SHEET 1.

WITNESSES

INVENTOR
J. Darling
BY
ATTORNEYS

J. DARLING.
MOLD.
APPLICATION FILED DEC. 6, 1916.

1,229,899.

Patented June 12, 1917.
3 SHEETS—SHEET 2.

WITNESSES

INVENTOR
James Darling
BY
ATTORNEYS

J. DARLING.
MOLD.
APPLICATION FILED DEC. 6, 1916.
1,229,899.
Patented June 12, 1917.
3 SHEETS—SHEET 3.
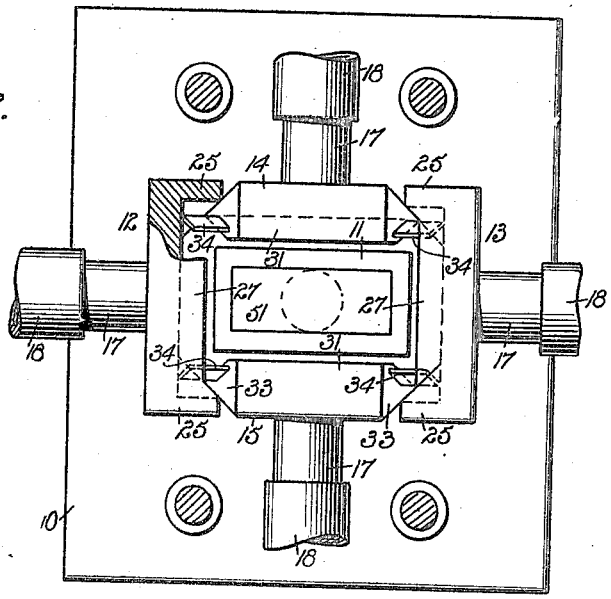
Fig. 7.
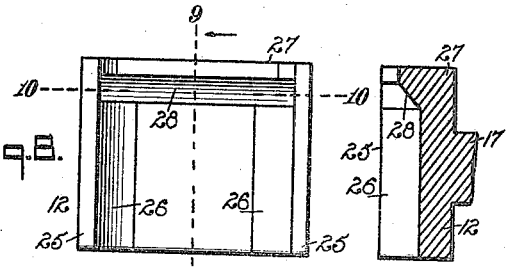
Fig. 8. Fig. 9.
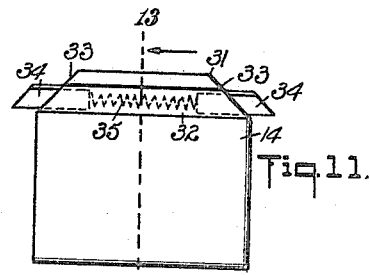
Fig. 11.
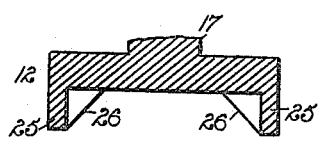
Fig. 10.
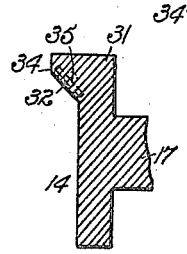
Fig. 12.
Fig. 13.
WITNESSES
INVENTOR
James Darling
BY
ATTORNEYS

UNITED STATES PATENT OFFICE.

JAMES DARLING, OF KENOVA, WEST VIRGINIA.

MOLD.

1,229,899.  Specification of Letters Patent.  Patented June 12, 1917.

Application filed December 6, 1916. Serial No. 135,348.

*To all whom it may concern:*

Be it known that I, JAMES DARLING, a citizen of the United States, and a resident of Kenova, in the county of Wayne and State of West Virginia, have invented a new and Improved Mold, of which the following is a full, clear, and exact description.

The object of the invention is to provide a new and improved mold more especially designed for pressing clay and other plastic, semi-dry or dry materials into a desired hollow or solid article of uniform density and equal thickness of all the walls in case of a hollow article.

In order to produce the desired result, use is made of movable mold members, and means for simultaneously moving the said movable mold members inward, the said movable mold members having contacting portions traveling one on the other and forming a completely closed chamber, thus confining the material to be molded within the said chamber and pressing the material to form a molded article of uniform density.

A practical embodiment of the invention is represented in the accompanying drawings forming a part of this specification, in which similar characters of reference indicate corresponding parts in all the views.

Fig. 7 is a plan view of the same with parts in section;

Fig. 8 is an inner face view of one of the mold members;

Fig. 9 is a cross section of the same on the line 9—9 of Fig. 8;

Fig. 10 is a sectional plan view of the same on the line 10—10 of Fig. 8;

Fig. 11 is an inner face view of another movable mold member;

Fig. 12 is a plan view of the same; and

Fig. 13 is a cross section of the same on the line 13—13 of Fig. 11.

Figure 1:
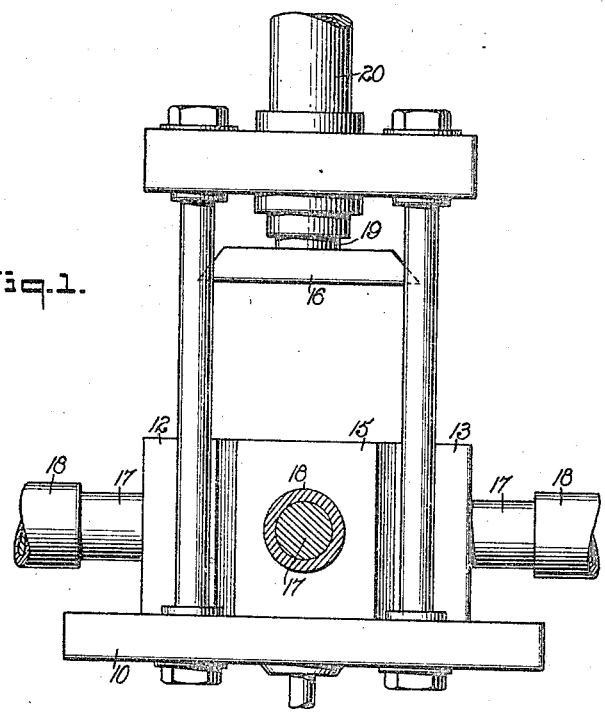
Figure 1 is a side elevation of the mold in position in a hydraulic press and with one of the press cylinders and its plunger in section.
Figure 2:
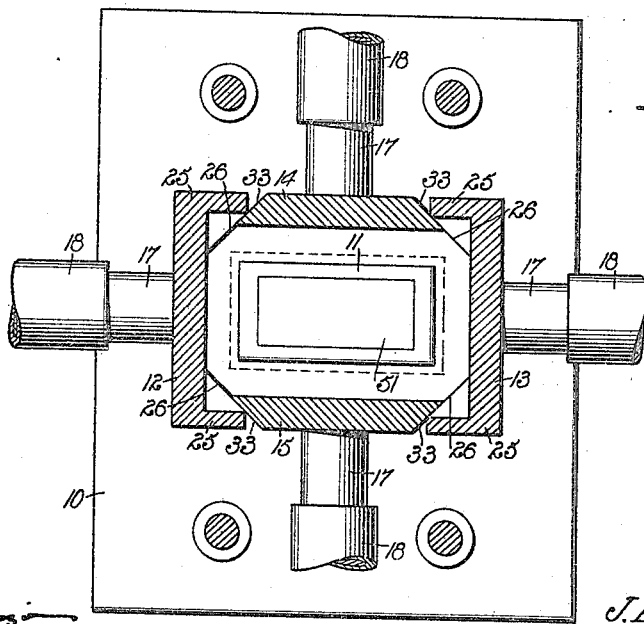
Fig. 2 is a sectional plan view of the same on the line 2—2 of Fig. 3 and showing the movable mold members in open position.

The mold illustrated in the drawing is more especially designed for making hollow articles but it is expressly understood that I do not limit myself to the particular construction disclosed as solid articles may also be made according to my invention.

On a suitably constructed bedplate 10 is fixed a mold member or core 11, and on the bedplate 10 are set movable side mold members 12, 13, 14 and 15, preferably arranged in pairs disposed opposite each other, and movable toward the corresponding sides of the fixed mold member or core 11. Thus the mold members 12 and 13 form a pair and are disposed opposite each other, and, in a similar manner, the mold members 14 and 15 are disposed opposite each other and join the mold members 12 and 13, as hereinafter more fully explained. Use is also made of a top mold member 16 adapted to engage the side mold members 12, 13, 14 and 15 at the top, and this mold member 16 moves toward the top of the fixed mold member or core 11. Suitable means may be employed for moving the side mold members 12, 13, 14 and 15 inward toward the fixed mold member or core 11; for instance, as shown, the side mold members are provided with horizontally disposed plungers 17 of hydraulic cylinders 18 of the usual construction. The top mold member 16 is mounted on a vertically disposed plunger 19 engaging a hydraulic cylinder 20.

The mold members 12 and 13 are alike in construction, and each is provided with side flanges 25 having their inner faces 26 beveled in an outward direction, as plainly shown in Figs. 8, 9 and 10. The upper end of each side mold member 12 and 13 is provided with a head 27 having an inner face 28 beveled in an upward and outward direction and extending across the top of the beveled faces 26 on the flanges 25. The mold sides 14 and 15 are alike in construction and each is provided at its sides with bevels 30 extending outwardly to fit slidingly on the beveled faces 26 of the other mold sides 12 and 13. Each of the mold sides 14 and 15 is provided with a head 31 having inner beveled faces 32 and beveled ends 33. The head 31 of each mold side 14 and 15 is provided with sliding plates 34 projecting beyond the beveled ends 33 and adapted to slidingly engage the beveled faces 28 of the heads 27 of the mold sides 12 and 13. The pair of plates 34 in a head 31 are pressed outwardly by a spring 35 mounted within the head 31, as indicated in Fig. 11. It is understood that the outer edges of the plates 34 are parallel with the bevels 33 and as the several bevels are all at an angle of 45° it is evident that the bevels snugly fit one on the other. The top mold member 16 has its edge provided with bevels 40 extending upwardly and inwardly and the said beveled edges 40 slidingly fit onto the beveled faces 28 and 32 of the mold sides 12, 13 and 14, 15.

Figure 3:
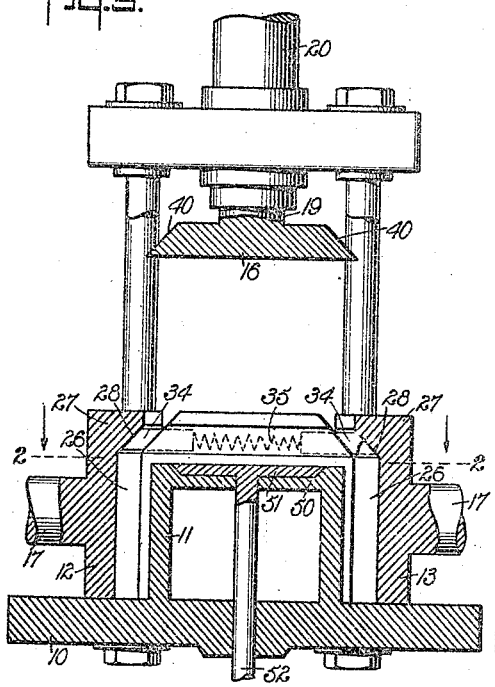
Fig. 3 is a sectional side elevation of the same.
Figure 5:
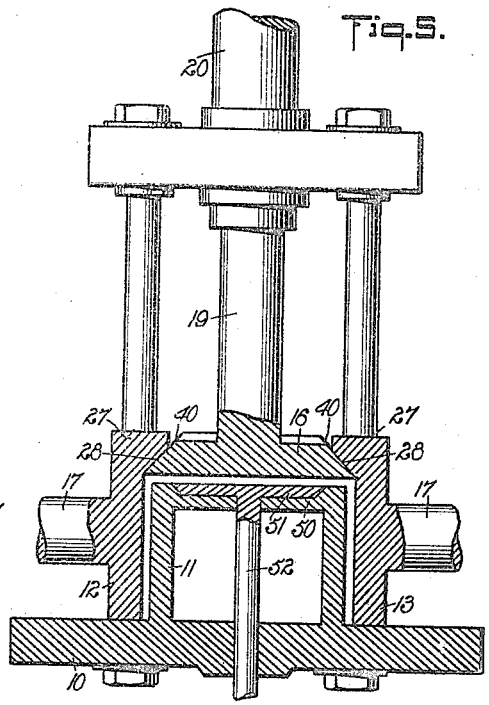
Fig. 5 is a similar view of the same with the movable mold members in final closed position.
Figure 4:
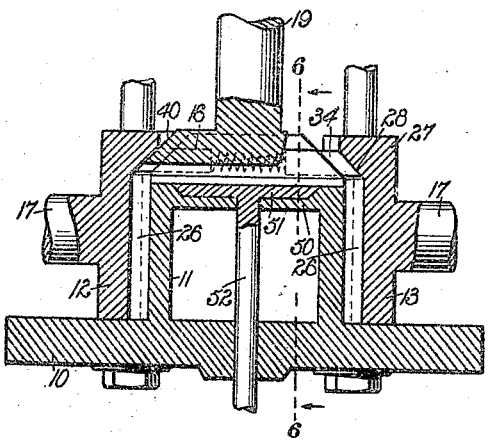
Fig. 4 is a similar view of the same with the movable mold members in partly closed position.
Figure 6:
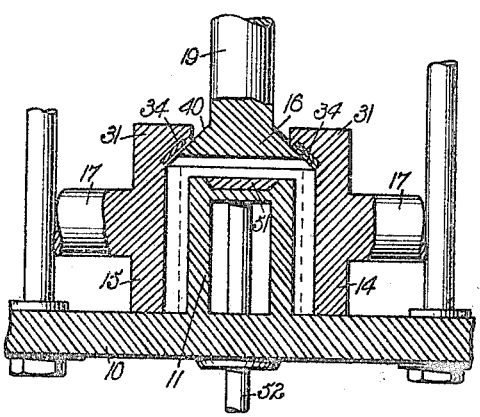
Fig. 6 is a transverse section of the same on the line 6—6 of Fig. 4.

The operation is as follows:

When the mold sides 12, 13, 14 and 15 are in open position and the top mold 16 is raised as shown in Fig. 3 then the mold sides 12, 13, 14 and 15 form with the bedplate 10 and the fixed mold member or core 11 a chamber closed at all sides but open at the top for the introduction of the clay or other plastic, semi-dry or dry material used for forming the desired article. The top mold member 16 is now lowered and the mold members 12, 13, 14, 15 and 16 are now simultaneously moved to compress the material in the completely closed chamber until the desired predetermined thickness is reached, as will be readily understood by reference to Fig. 5. It will be noticed that during this closing movement of the movable mold members the several beveled faces remain in sliding contact with each other and keep the chamber closed so that none of the material can escape, and as the relation in the size of the chamber when wholly open or completely closed can be varied to suit the nature of the material used, it is evident that the material is compressed to a predetermined uniform density and with the walls of the article of equal thickness. Thus the proportion of the open and closed chamber and the material contained therein relative to the sides of the closed chamber may be 2 to 1, 3 to 1, or whatever proportion is found desirable according to the nature of the material, that is, whether the latter is plastic, semi-dry or dry. After the article has been pressed, the mold sides 12, 13, 14 and 15 are moved outward back to normal open position, and the top mold member 16 is raised to allow lifting of the molded articles off the core 11. In order to facilitate this movement the top of the fixed mold member or core 11 is provided with a recess 50 in which is normally seated a plate 51 mounted on a plunger 52 extending downwardy through the top of the core 11 and through the bedplate 10 to connect with a hydraulic cylinder or with other means for imparting an upward movement to the plate 51 with a view to lift the molded article off the core 11.

It is understood that the mold sides 12, 13, 14 and 15 are only opened to the extent of the intended compression for forming a wall of a desired thickness, but in every case the chamber formed by the base plate, mold sides, top mold and core 11 is completely closed to confine the material therein during the compression.

In forming solid articles the core 11 is dispensed with.

Having thus described my invention, I claim as new and desire to secure by Letters Patent:—

1. A mold, comprising a bed, a top mold member, side mold members set on and movable on the bed, the said side mold members having inwardly projecting portions beveled in an upward and inward direction, and the said top mold members having beveled edges fitting the said beveled portions of the said side mold members, the said bed, top and side mold members forming a closed chamber adapted to confine the material therein, and means for simultaneously imparting movement to the said mold members to press the material until it reaches a predetermined density.

2. A mold, comprising a bed, a top mold member and side mold members set on and movable on the bed, the said side mold members having inwardly projecting portions beveled in an upward and inward direction and the said top mold members having beveled edges fitting the said beveled portions of the said side mold members, the said side mold members being arranged in pairs and the mold members of a pair being disposed opposite each other, the side mold members of one pair having side flanges, the inner faces of which are beveled and the two oppositely disposed side members of another pair having beveled side edges engaging the beveled faces of the said flanges, the said bed, top and side mold members forming a closed chamber adapted to confine the material therein, and means for simultaneously imparting movement to the said mold members to press the material until it reaches a predetermined density.

3. A mold, comprising a bed, a top mold member and side mold members set on and movable on the bed, the said side mold members having inwardly projecting portions beveled in an upward and inward direction and the said top mold members having beveled edges fitting the said beveled portions of the said side mold members, the said side mold members being arranged in pairs and the mold members of a pair being disposed opposite to each other, the mold members of one pair having side flanges, the inner faces of which are beveled in an outward direction and the mold members of an adjacent pair having beveled side edges engaging the beveled faces of the said flanges and the inward portions of this pair of mold members having spring-pressed sliding plates engaging the beveled face portions of the adjacent mold members, the said bed, top and side mold members forming a closed chamber adapted to confine the material therein, and means for simultaneously imparting movement to the said mold members to press the material until it reaches a predetermined density.

4. A mold having movable side mold members arranged in pairs and provided at the sides with contacting beveled faces, the contacting faces of one pair being adapted to slide on the contacting faces of the other pair, the said mold members having closing heads beveled at their inner faces, the sides of the heads of one pair of mold members being beveled and slidable on the beveled faces of the heads of the other pair of mold members.

5. A mold having movable side mold members provided at the sides with contacting beveled faces, the mold members being arranged in pairs and the mold members of a pair being disposed opposite each other, the contacting faces of one pair being adapted to slide on the contacting faces of the other pair the said mold members having closing heads beveled at their inner faces, the sides of the heads of one pair of mold members being beveled and slidable on the beveled faces of the heads of the other pair of mold members and a closing mold member having beveled edges slidably engaging the beveled faces of the heads of the said side mold members.

6. A mold having movable side mold members arranged in pairs and provided at the sides with contacting beveled faces, the contacting faces of one pair being adapted to slide one on the contacting faces of the other pair the said mold members having closing heads beveled at their inner faces, the sides of the heads of one pair of mold members being beveled, and spring-pressed plates slidable in the heads of the side mold members having beveled sides, the said plates projecting beyond the said beveled sides and engaging the beveled faces of the heads of the other pair of mold members.

7. A mold, comprising a bedplate, a mold fixed thereon, side mold members movable on the said bed plate toward the corresponding sides of the said fixed mold member, the said side mold members being arranged in pairs and the side mold members of a pair being arranged opposite to each other, the side mold members of one pair having beveled end flanges and beveled heads and the side mold members of another pair having beveled sides and beveled heads, the latter being beveled at the sides and provided with spring-pressed plates and a top mold member having beveled edges fitting the beveled heads of the said side mold members.

8. A mold, comprising a bedplate, a mold fixed thereon, side mold members movable on the said bedplate toward the corresponding sides of the said fixed mold member, the said side mold members being arranged in pairs and the side mold members of a pair being arranged opposite each other, the side mold members of one pair having beveled end flanges and beveled heads, and the side mold members of another pair having beveled sides and beveled heads, the latter being beveled at the sides and provided with spring-pressed plates, a top mold member having beveled edges fitting the beveled heads of the said side mold members, an ejector plate normally sunk in the top of the said fixed mold member, means for imparting simultaneous movement to the said side mold members and the said top mold member, and means for subsequently imparting movement to the said ejector plate.

9. A mold having movable side mold members arranged in pairs, the members of a pair being disposed opposite to each other, the members of one pair having side flanges the inner faces of which are beveled, and the mold members of the other pair having beveled side edges engaging the inner beveled faces of said flanges.

10. A mold having movable side mold members arranged in pairs, the members of a pair being disposed opposite to each other, the members of one pair having side flanges the inner faces of which are beveled and heads having beveled inner faces and the mold members of the other pair having beveled sides engaging the inner beveled faces of the said flanges, and heads having inner beveled faces and beveled ends.

JAMES DARLING.

Copies of this patent may be obtained for five cents each, by addressing the "Commissioner of Patents, Washington, D. C."